United States Patent [19]

Huang

[11] Patent Number: 5,557,481
[45] Date of Patent: Sep. 17, 1996

[54] NRZ TO RLL ENCODER CIRCUIT IN DISK DRIVE READ/WRITE CHANNEL

[75] Inventor: Yihe Huang, Palo Alto, Calif.

[73] Assignee: Exar Corporation, San Jose, Calif.

[21] Appl. No.: 433,949

[22] Filed: May 3, 1995

[51] Int. Cl.⁶ .............................. G11B 5/09; G06M 3/00; G11C 19/00
[52] U.S. Cl. .................... 360/41; 360/51; 371/26; 371/68
[58] Field of Search .................. 360/40, 41, 51, 360/46; 341/59, 68; 369/59, 60; 377/26, 67, 81, 68; 327/115, 117, 141, 154, 162, 174, 175, 176, 241

[56] References Cited

U.S. PATENT DOCUMENTS

| | | | |
|---|---|---|---|
| 4,916,558 | 4/1990 | Nishimura et al. | 360/51 |
| 5,349,350 | 9/1994 | Blagaila | 341/59 |

*Primary Examiner*—Aristotelis Psitos
*Assistant Examiner*—Regina Y. Neal
*Attorney, Agent, or Firm*—Townsend and Townsend and Crew LLP

[57] ABSTRACT

An encoder circuit in the read/write channel of a disk drive encodes NRZ data from a host computer into RLL data to be stored in the disk drive even at high frequencies of the RLL clock. Serial NRZ input data is first converted into two parallel NRZ data signals. The second NRZ signal is delayed by one clock cycle with respect to the first NRZ signal. A clock derived from the NRZ clock signal clocks the parallel NRZ signals through a first stage of flip-flops. An RLL clock signal then drives the parallel data signals through the remaining stages of flip-flops into a block of combinational encoding logic, where the NRZ data signals are converted into RLL data output to be stored on the disk surface. By splitting the serial NRZ input into two parallel signals and clocking the signals with a clock derived from the NRZ clock, the NRZ data is made valid for a longer period of time, making the encoder circuit less susceptible to the problem of clock drift which might cause asynchronous circuit operation.

7 Claims, 5 Drawing Sheets

NRZ TO RLL ENCODER CIRCUIT IN DISK DRIVE READ/WRITE CHANNEL

BACKGROUND OF THE INVENTION

The present invention relates generally to the read/write channel in a disk drive. More particularly, the invention is directed to an encoder circuit in the read/write channel for encoding NRZ data input from a host computer to RLL data output to the head/disk assembly of the disk drive.

A typical computer system includes a host computer coupled to other system components by a system bus. The system component typically used for data storage is a disk drive. The operational circuitry for the disk drive would usually include a controller to control drive functions and read/write circuitry to transfer data between the host computer and the disk heads. Host computer data is typically encoded in a nonreturn to zero (NRZ) format, which is a method of coding data in which the signal representing binary digits alternates between a positive and zero voltage when there is a change in successive bits, either from a high (1) to a low (0), or vice versa. Disk data, on the other hand, is stored according to a run length limited (RLL) format, which is another method of coding data. RLL coding avoids the possibility of a data stream including a lengthy sequence of consecutive high or low signal values. RLL coding must be used in the disk drive because the phase-locked loop and automatic gain control circuitry used in storing data on and reading data from the disk require alternative high and low signals in order to provide accurate performance. For example, one possible RLL encoding scheme is RLL (1,7), which means that for every seven low signal values, there must be at least one high signal value.

Each data stream, NRZ data and RLL data, has its own clock for transferring data through the system, the NRZ clock and RLL clock, respectively. The NRZ data from the host is encoded into RLL data for the disk heads in the read/write channel encoder circuitry. Both the NRZ clock and RLL clock must remain properly synchronized in relation to each other in order to ensure that data is encoded accurately. If the encoding operates asynchronously, the encoded RLL output will not accurately reflect the NRZ data input. One possible reason for asynchronous operation is a temperature-induced clock drift, which would cause a triggering clock edge outside of its associated data window. Current encoder circuits use a signal operating at twice the frequency of the RLL clock to lock the RLL data window to the NRZ data window. This approach is effective at lower frequencies of the RLL clock, but breaks down as the RLL clock frequency reaches its upper limit, where the faster RLL clock is not available due to manufacturing process limitations.

Thus, it would be desirable to have an encoder circuit that can synchronize the NRZ clock and RLL clock even at high frequencies of the RLL clock.

SUMMARY OF THE INVENTION

The present invention is directed to an encoder circuit in the read/write channel of a disk drive that can encode NRZ data from the host into RLL data to the drive even at high frequencies of the RLL clock. The serial NRZ input data is first converted into two parallel NRZ data signals. The second NRZ signal is delayed by one clock cycle with respect to the first NRZ signal. A clock derived from the NRZ clock signal clocks the two NRZ data signals through a first stage of flip-flops. Another clock derived from the RLL clock signal then drives the data signals through the remaining stages of flip-flops into a block of combinational encoding logic, where the NRZ data signals are converted into RLL data output to be stored on the disk surface. By splitting the serial NRZ input into two parallel signals and clocking them with a clock derived from the NRZ clock, a "transition" NRZ data window is created in which the NRZ data is valid for a longer period of time than the serial NRZ data stream. Thus, the encoder circuit is not as susceptible to the problem of temperature-induced clock drift described above because, even if the clock were to drift by some amount, it is not as likely to drift entirely outside of the transition NRZ data window.

A further understanding of the nature and advantages of the inventions herein may be realized by reference to the remaining portions of the specification and the attached drawings.

DESCRIPTION OF THE PREFERRED EMBODIMENT

Figure 1:
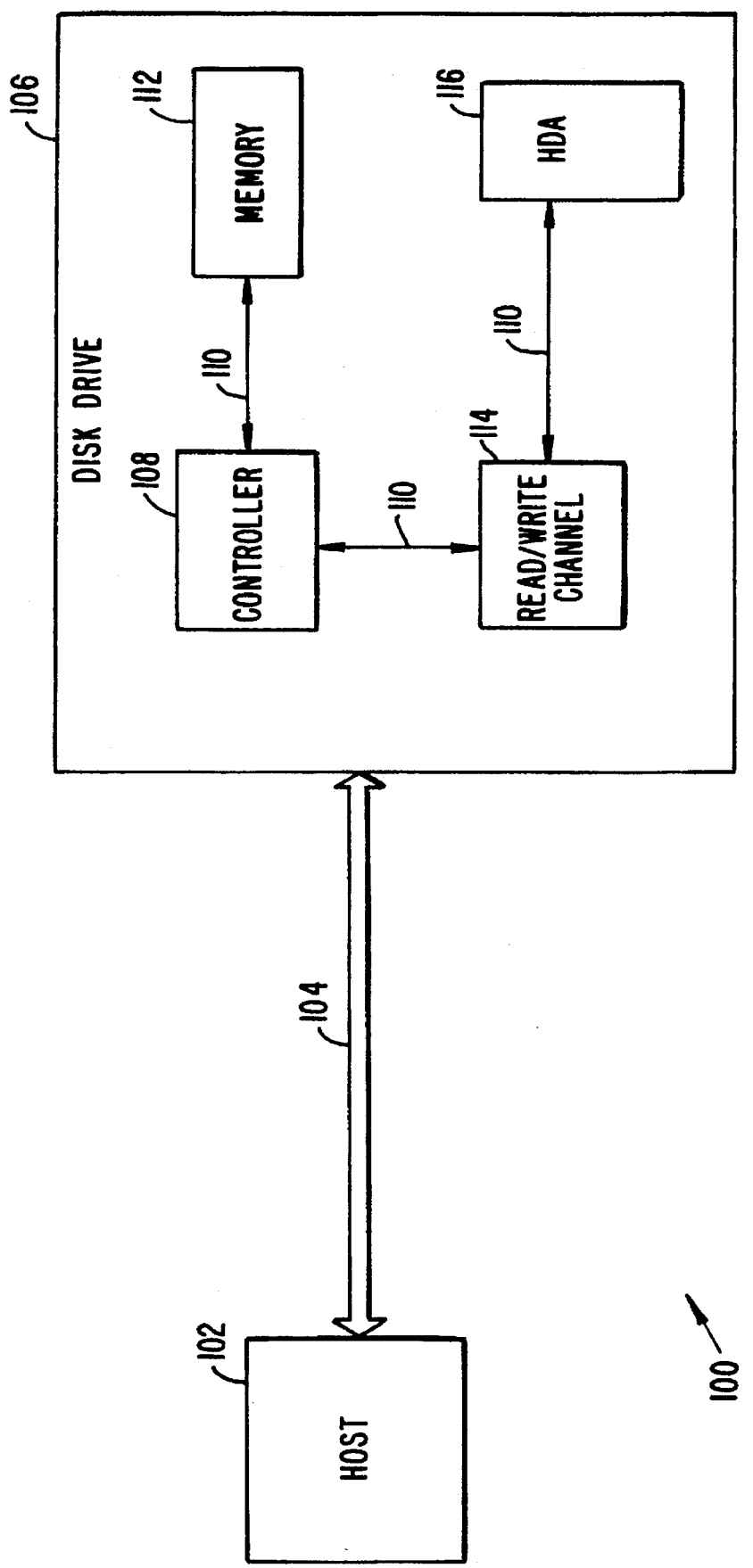
FIG. 1 is a simplified functional block diagram of a typical computer system including a host computer and a disk drive.

FIG. 1 is a simplified functional block diagram of a typical computer system 100, including a host computer 102 coupled to other system components by a system bus 104. A system component typically used for data storage is disk drive 106. The disk drive is controlled by a controller 108 that may be, for example, a microprocessor. Drive bus 110 couples controller 108 to other elements of the drive, such as memory 112. Data is transferred between host 102 and disk drive 106 through memory 112 under the control of controller 108. In executing a write operation, data is transferred by controller 108 from memory 112 through read/write channel 114 and written in the drive head/disk assembly (HDA) 116. In executing a read operation, data is read out of HDA 116 and again transferred through read/write channel 114 by controller 108.

Figure 2:
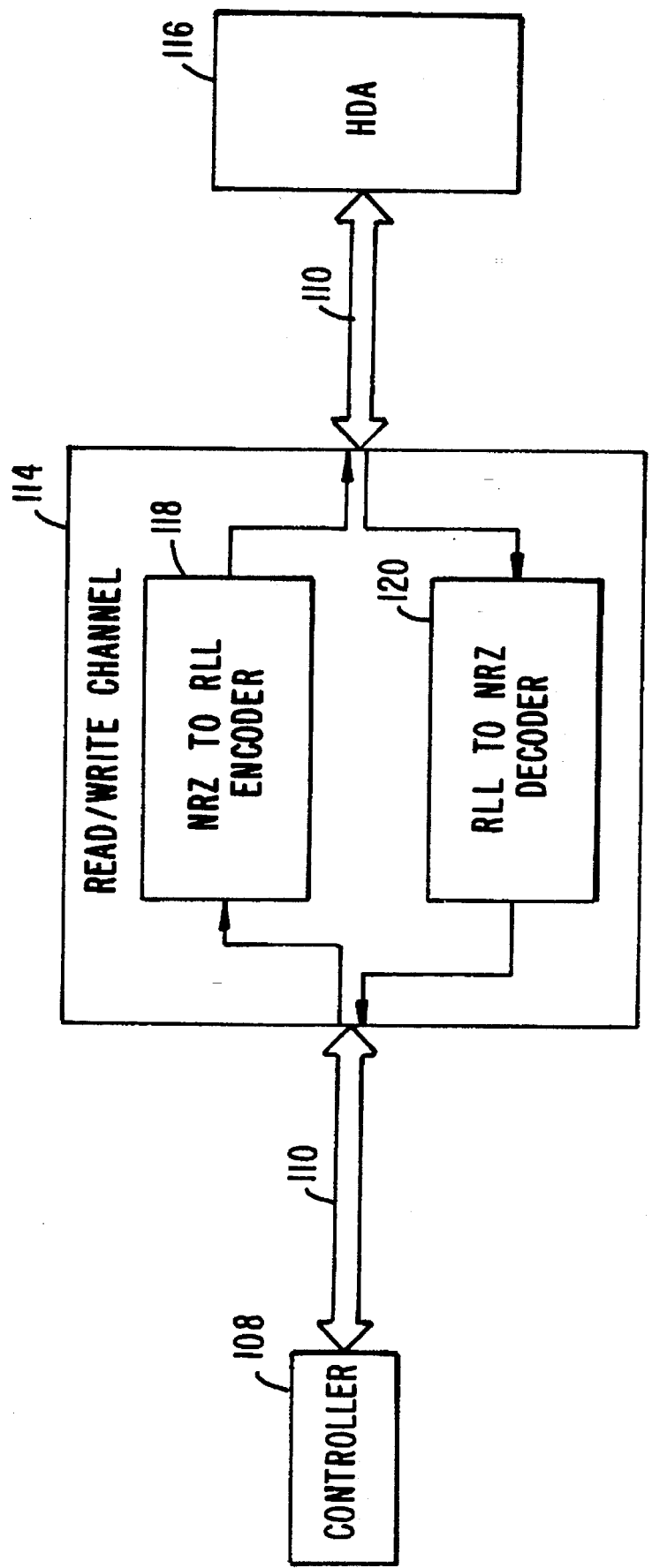
FIG. 2 is a simplified functional block diagram showing detail of the read/write channel of FIG. 1, including the encoder circuit of the present invention.

FIG. 2 is a simplified functional block diagram showing additional detail of read/write channel 114, which includes an encoder circuit 118 that encodes NRZ-coded data from the host into RLL-coded data that is stored in HDA 116, as well as a decoder circuit 120 that decodes RLL-coded data from HDA 116 back into NRZ-coded data to be read by the host. Encoder circuit 118 requires two clock signals at different frequencies to clock the separate data streams and synchronize them to one another. An NRZ clock defines an NRZ data window, while an RLL clock defines an RLL data window. The NRZ clock and RLL clock must remain properly synchronized in relation to each other in order to ensure that data is encoded accurately. If the clocks do not operate synchronously, the encoded RLL output will not accurately reflect the NRZ data input.

Figure 3:
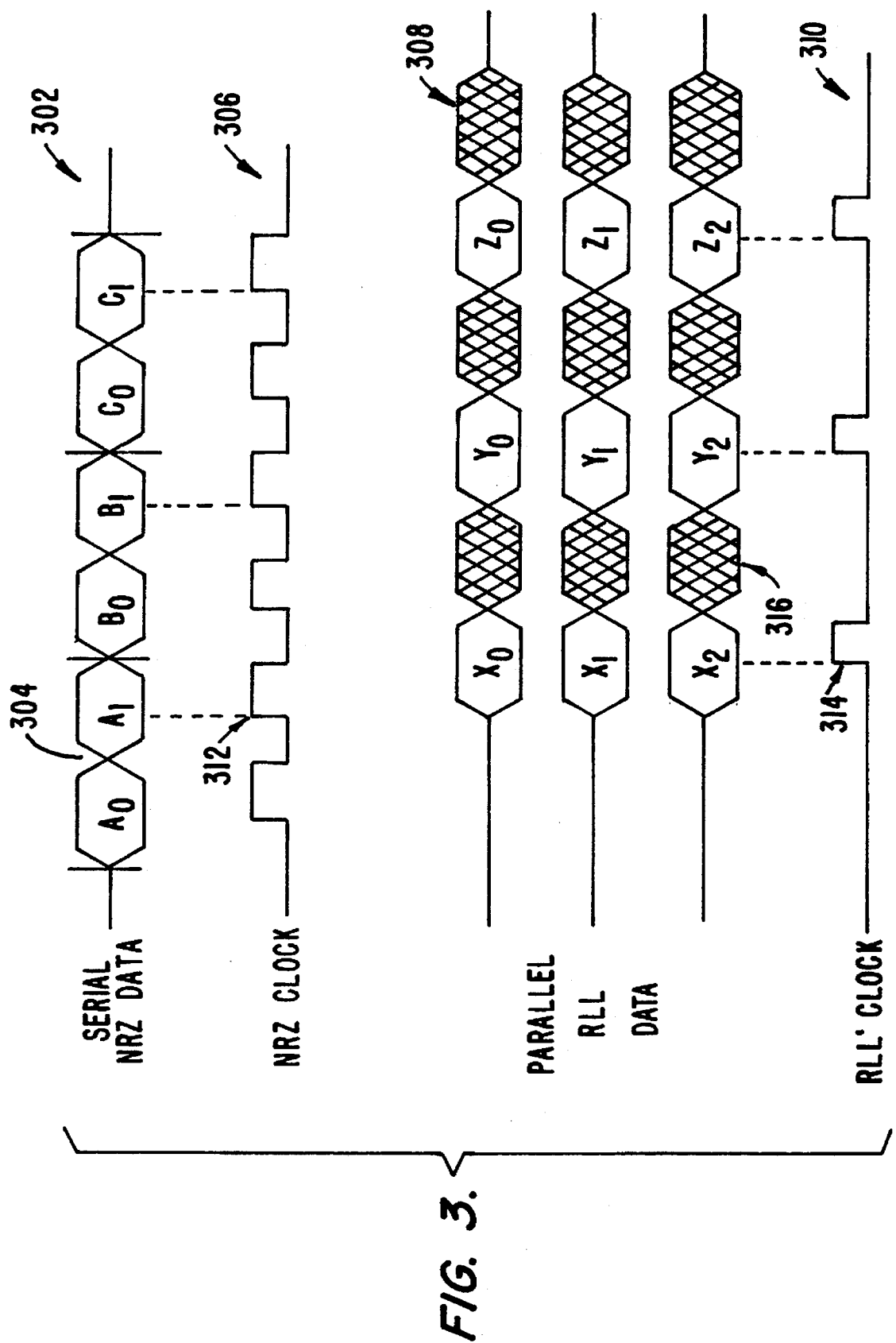
FIG. 3 is a timing diagram that shows the potential for the circuit to experience failure because of asynchronous operation.

FIG. 3 is a timing diagram that shows the potential for the circuit to experience failure because of asynchronous operation. NRZ data 302 is input serially into the encoder circuit 118 (FIG. 2). For purposes of encoding the data, the encoding logic must read two NRZ data bits and convert these bits into three RLL data bits. Thus, the serial NRZ data has an intrinsic data window 304 of two bits, for example, $A_0$ and $A_1$. The data is clocked into the encoding logic by NRZ clock 306. In order for encoder circuit 118 to encode both NRZ data bits $A_0$ and $A_1$ into three RLL data bits, the encoder must wait until both bits in the NRZ window 304 have been clocked into the encoder by NRZ clock 306. Thus, the actual encoding step is performed after the second bit $A_1$ in data window 304 has been clocked into the encoding logic. Encoder circuit 118 outputs parallel RLL data 308, which as noted above, yields three RLL bits $X_0$, $X_1$ and $X_2$ for every two NRZ bits $A_0$ and $A_1$. The RLL data 308 is then clocked through the circuit and on to HDA 116 (FIG. 2) by RLL' clock 310. RLL' clock 310 is derived from the RLL clock signal. In a preferred embodiment, the RLL clock signal is divided by three to generate RLL' clock 310.

As can be seen in FIG. 3, reliable operation of the encoder circuit depends upon the relative position of edge 312 of the NRZ clock with respect to edge 314 of the RLL' clock. If the RLL' clock 310 drifts relative to the NRZ clock 306, then RLL' clock edge 314 may drift to the next bit position and Clock in incorrect RLL data 316, instead of correct RLL bits $X_0, X_1$ and $X_2$. Edge 312 must fall in the middle of bit $A_1$ so that the NRZ data clocked into the encoding logic is a valid representation of the data in NRZ window 304. One potential cause of clock drift might be, for example, an increase in the operating temperature of the computer system. Current encoder circuits use a signal operating at twice the frequency of the RLL clock to lock the RLL data window to the NRZ data window. This approach is effective at lower frequencies of the RLL clock, but breaks down as the RLL clock frequency reaches its upper limit, where the faster RLL clock is not available due to manufacturing process limitations.

Figure 4:
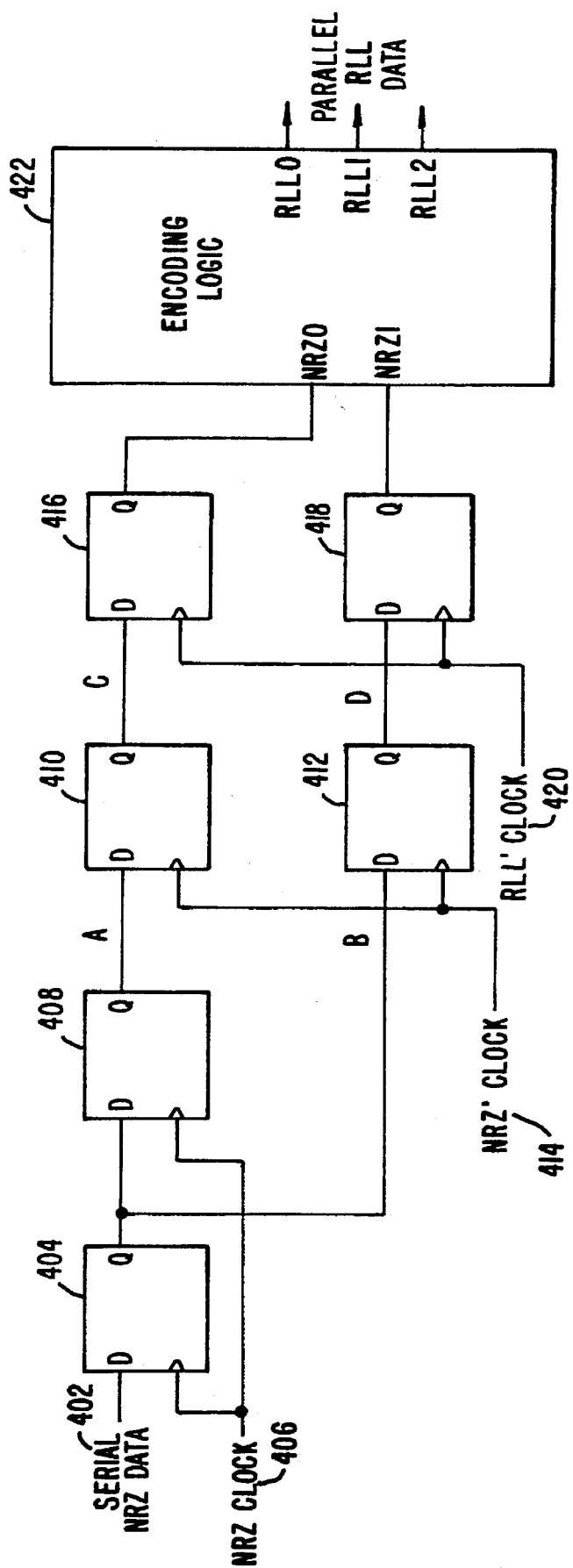
FIG. 4 is a simplified block diagram of the encoder circuit according to the present invention that synchronizes the NRZ data and the RLL data at higher frequencies of the RLL clock.

FIG. 4 shows a simplified block diagram of a preferred embodiment of encoder circuit 118 according to the present invention that synchronizes the NRZ data and the RLL data even at higher frequencies of the RLL clock. Serial NRZ data 402 is the input signal to flip-flop 404, clocked by NRZ clock 406. The output signal of flip-flop 404 serves as the input signal to flip-flop 408, which is also clocked by NRZ clock 406. At this point, the serial NRZ data is broken up into two parallel signals, so that the two bits making up an NRZ data window are clocked in parallel to encoding logic that translates the NRZ data into RLL data. The output signal from flip-flop 408 is input to flip-flop 410 (node A in the figure), while the signal at the input to flip-flop 408 of the previous stage in the chain is also input to flip-flop 412 (node B). Therefore, the two input signals to flip-flops 410 and 412 represent the two data bits $A_0$ and $A_1$, respectively, in an NRZ data window. Parallel flip-flops 410 and 412 are not clocked with the NRZ clock, but are instead driven by an NRZ' clock 414 that provides a "transition" NRZ data window. In a preferred embodiment, NRZ' clock 414 may be a clock signal operating at half the frequency of the NRZ clock 406. The key feature of NRZ' clock 414 is that it must lengthen the data window to a point where the problems associated with clock drift noted above do not arise.

The output signal from flip-flop 410 is then input to flip-flop 416 (node C), while the output signal from flip-flop 412 is input to flip-flop 418 (node D). Each flip-flop 416 and 418 is clocked by RLL' clock 420 into a block of encoding logic 422, where the NRZ data is encoded into RLL data. Again, as noted above, in a preferred embodiment, RLL' clock 420 represents a signal operating at one-third the frequency of the original RLL clock. Because the transition NRZ data window is longer than a data window in the serial NRZ data stream, even if the RLL' clock 420 were to drift because of an increase in operating temperature, for example, the clock will not drift far enough to clock in data when it is in unstable or drift outside the data window itself. The present invention avoids the difficulty of squeezing the higher frequency RLL clock into an NRZ data window, which is the current method of synchronization, as described above. Instead, the transition NRZ data window is stretched out so that a clock signal derived from the standard RLL clock fits more easily within the data window and clocks the NRZ data into the encoding logic block. Thus, the RLL' clock 420 is guaranteed to clock valid NRZ data into the encoding logic block 422.

Figure 5:
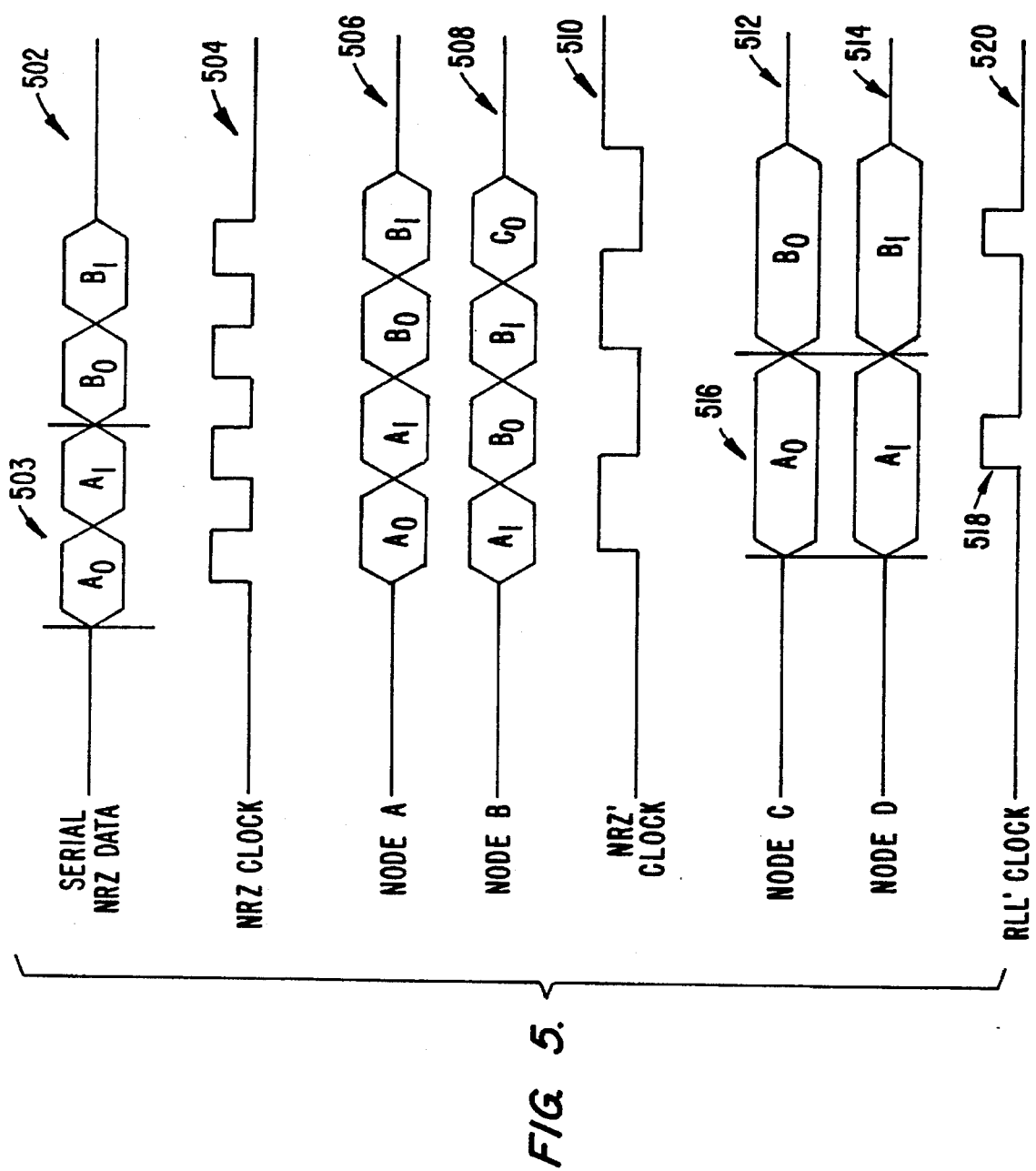
FIG. 5 is a timing diagram that shows the relationship of the data and clock signals shown in FIG. 4.

FIG. 5 is a timing diagram depicting the relationship of the signals shown in FIG. 4. The serial NRZ data stream 502 is the input to the encoder circuit and flip-flop 404. Again, the NRZ data window 503 is intrinsically two bits wide. The serial NRZ signal is clocked by NRZ clock 504 to the inputs of flip-flops 410 and 412. NRZ data signal 502 is broken up into two parallel signals: the input to flip-flop 410 at node A is shown by data signal 506, while the parallel signal input to flip-flop 412 at node B is shown by data signal 508. The first bit A0 in an NRZ data window is input to flip-flop 410, while the second bit A1 in the same NRZ data window is input in parallel to flip-flop 412. Flip-flops 410 and 412 are clocked with an NRZ' clock 510, as discussed above. In the preferred embodiment, NRZ' clock 510 operates at half the frequency of the original NRZ clock 504. Thus, the data signal output from flip-flops 410 at node C and from flip-flop 412 at node D, the parallel NRZ signals 512 and 514, respectively, that form a transition NRZ data window 516 remain unchanged for twice the length of time as the serial NRZ data signal bits. This extra time ensures that edge 518 of RLL' clock 520 will clock in valid and accurate NRZ data signals 512 and 514 into encoding logic block 422 (FIG. 4). Encoding logic block 422 then encodes the two parallel NRZ bits in signals 512 and 514 into three RLL data bits, as shown in FIG. 3 above.

Since the RLL' clock 520 is designed to clock NRZ data in the middle of the elongated NRZ transition data window 516, it is apparent from FIG. 5 that even if edge 518 of RLL' clock 520 drifts in either direction due to temperature effects, it will not drift to the edges of transition window 516 for A0 or A1 in signal 512 or 514, respectively, where the possibility arises of clocking the data signal while it is unstable, which means the input to encoding logic block 422 would be unreliable. Additionally, the clock cannot drift so far as to clock data from the adjoining data window, such as bits B0 or B1 into encoding logic 422, which could mean that the input to the encoding logic block is incorrect. Again, rather than squeezing a modified RLL clock operating at twice the frequency of the standard RLL clock into only one-half of an NRZ data window, as is done currently, the NRZ transition data window 516 is instead stretched out so that the triggering edge 518 of RLL' clock signal 520, derived from a standard RLL clock, occurs at the midpoint of the NRZ transition data window 516 and clocks the parallel NRZ data bits into the encoding logic block. Thus, the RLL' clock is guaranteed to clock valid NRZ data into the encoding logic block 422.

The present invention has now been explained with reference to specific embodiments. Other embodiments will be apparent to those of ordinary skill in the art. It is therefore not intended that this invention be limited except as indicated by the appended claims.

What is claimed is:

1. In a disk drive including a controller coupled to a read/write channel and a head/disk assembly, the read/write channel comprising:

a serial nonreturn-to-zero (NRZ) data input;

a first NRZ clock input;

a first memory block coupled to said serial NRZ data input and said first NRZ clock input having a first parallel NRZ data output;

a second NRZ clock input;

a second memory block coupled to said first parallel NRZ data output and said second NRZ clock input having a second parallel NRZ data output;

a run-length limited (RLL) clock input; and a third memory block coupled to said second parallel NRZ data output and said RLL clock input.

2. The read/write channel of claim 1 wherein the first memory block further comprises:

a first flip-flop coupled to said serial NRZ data input and said first NRZ clock input having an output; and a second flip-flop coupled to said output of said first flip-flop and said first NRZ clock having an output.

3. The read/write channel of claim 2 wherein the second memory block further comprises:

a first flip-flop coupled to said output of said first flip-flop in said first memory block and said second NRZ clock input having an output; and a second flip-flop coupled to said output of said second flip-flop in said first memory block and said second NRZ clock input having an output.

4. The read/write channel of claim 3 wherein the third memory block further comprises:

a first flip-flop coupled to said output of said first flip-flop in said second memory block and said RLL clock input having an output; and a second flip-flop coupled to said output of said second flip-flop in said second memory block and said RLL clock input having an output.

5. The read/write channel of claim 1 wherein said second NRZ clock input operates at half frequency of said first NRZ clock input.

6. A method of encoding a serial nonreturn-to-zero (NRZ) data input into a parallel run-length limited (RLL) data output comprising the steps of:

clocking the serial NRZ data input into a first memory block with a first NRZ clock input;

separating the serial NRZ data into two parallel NRZ data inputs;

clocking said two parallel NRZ data inputs into a second memory block with a second NRZ clock input;

clocking said two parallel NRZ data inputs into a third memory block with an RLL clock;

coupling said two parallel NRZ data inputs to an encoding logic block; and encoding said two parallel NRZ data inputs into three parallel RLL data outputs.

7. The method of claim 6 wherein said step of clocking said two parallel NRZ data inputs into a second memory block further comprises clocking said two parallel NRZ data inputs into a second memory block with a second NRZ clock input operating at half frequency of said first NRZ clock input.

* * * * *